June 1, 1965   J. J. FRANTZEN   3,186,883
ETCHING POLYESTER FILM
Filed Nov. 2, 1962

INVENTOR.
JOHN J. FRANTZEN
BY John E. Stryker
ATTORNEY

United States Patent Office 3,186,883
Patented June 1, 1965

3,186,883
ETCHING POLYESTER FILM
John J. Frantzen, St. Paul, Minn., assignor to Buckbee-Mears Company, St. Paul, Minn., a corporation of Minnesota
Filed Nov. 2, 1962, Ser. No. 235,090
3 Claims. (Cl. 156—7)

This invention relates to the etching of polyester film and particularly to the etching of "Mylar" film, a product of E. I. Du Pont de Nemours & Company. Such film is made from polyethylene terephthalate, the polymer formed by the condensation reaction between ethylene glycol and terephthalic acid. This polyester film is characterized by outstanding strength, durability, electrical properties, chemical inertness and thermal stability over a wide range of temperatures. It is used extensively for electrical insulation and has many non-electrical applications such as decorative laminations, vapor barrier materials and various types of industrial tapes and magnetic recording tapes. However, the known solvents and etching agents for "Mylar" film are so toxic that the use thereof in industrial operations is hazardous to the point of being impractical and unnecessarily costly. Also, because of its toughness, elasticity and other physical properties, such film is difficult to form with minute perforations or die cut mechanically in predetermined, precisely located areas.

It is, therefore, an object of the present invention to provide a non-toxic etching composition and low-cost method for etching polyethylene terephthalate resin sheets or films.

A particular object is to provide a method of etching such materials which comprises applying to a selected area or areas thereof the reaction product of a solution of phenol and fuming sulfuric acid in a strong sulfuric acid medium.

For optimum results with regard to the rate of etching and texture or smoothness of etched surfaces a solution is formed from the following constituents in approximately the proportions by weight as follows:

| | Percent |
|---|---|
| Phenol (crystals) | 38.0 |
| Water | 4.5 |
| Sulfuric acid (fuming 15%–18%) 98% sulfuric acid containing 15%–18% of free sulfur trioxide | 57.5 |

*Example of procedure*

Eighty (80) grams of phenol crystals are dissolved in 12 grams of water by heating and agitating the mixture until the crystals are in solution. The dissolution of the crystals is expedited by heating the mixture to a temperature within the range of approximately 95 degrees to 210 degrees F. The temperature of this phenol solution is then reduced to approximately 60 degrees F. and fuming sulfuric acid in an amount equal to approximately 150 grams is added to the aqueous phenol solution gradually, with agitation and cooling sufficient to prevent the solution from boiling. The reaction produces mainly the phenol 2,4 disulforic acid in a strongly sulfuric acid medium.

The resulting composition is most effective when used at a temperature of from 220° F. to 230° F. The etching rate is approximately .001 inch per minute at this temperature. When applied at the temperature indicated, this etching composition disintegrates or breaks down the contacted portions of the "Mylar" film so that such portions may be readily removable by lixivation leaving smooth, clean-cut etched surfaces.

The presence of a small amount of water, on the order of 3% to 6% by weight, affords good control of the etching rate. The amount of water used to dissolve the phenol may be varied to adjust the etching power and texture of the etched surfaces.

The accompanying drawing illustrates, schematically, by way of example and not for the purpose of limitation, an etched "Mylar" product and a succession of procedural steps for forming precisely sized and located apertures in the product, utilizing my improved etching composition.

Figure 1:
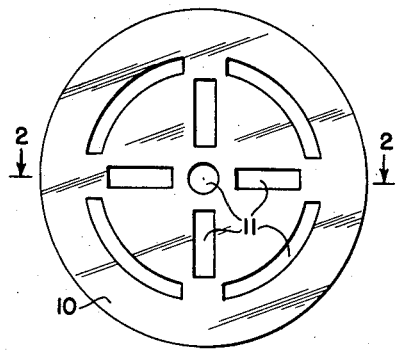
FIGURE 1 is a plan view showing a finished product having etched openings in "Mylar" sheet material.
Figure 2:
FIG. 2 is a cross sectional view of the product taken on the line 2—2 of FIG. 1.

Referring to FIGS. 1 and 2, a polyester sheet member 10 is shown with apertures 11 formed therein by etching. "Mylar" films for use as the member 10 are presently available in thicknesses ranging from 0.00025 to 0.010 inch. Reproduction of the pattern of apertures on the member 10 may be accomplished by printing procedure using as "ink" a suitable etching resist enamel which is not reactive to the etching composition. For maximum accuracy the pattern may be reproduced on the "Mylar" blank by photo-printing procedure using photographic film in contact with both faces of the blank. Thus, an opaque image of each aperture may be placed in registry one with another on opposite sides of the enamel coated blank in accordance with conventional photo-printing procedure, preparatory to the etching treatment. Suitable light-sensitive enamels for application to the "Mylar" blank are the products of Eastman Kodak Company designated as K.M.E.R. and K.P.R. These products are characterized particularly by their photo-sensitive qualities and by their substantial non-reactance to the etching agent which is applied to the "Mylar."

Figure 3:
FIGS. 3, 4 and 5 illustrate successive steps in the process, including photo-printing and etching procedure.
Figure 4:
Figure 5:

FIG. 3 shows the blank member 10 with a coating 12 of light-sensitive enamel on both sides. By photo-printing and developing treatment surface areas 13 defining the areas to be etched are exposed, as indicated in FIG. 4, leaving etching resist enamel 14 covering other areas. My improved etching composition is then applied to the blank and the etching is continued until the apertures 11 are formed as indicated in FIG. 5. Finally the enamel 14 may be removed by the application of a suitable solvent therefor to complete a product such as that shown in FIGS. 1 and 2.

Figure 6:
FIGS. 6, 7, 8 and 9 illustrate successive steps in procedure for producing a modified product wherein the polyester base sheet is laminated to covering metal sheets and perforated by photo-printing and etching procedure.
Figure 7:

FIGS. 6 to 9 inclusive illustrate a modification of the invention wherein a polyester base sheet 15 is laminated between thin metal sheets indicated at 16, the latter being permanently bonded to the polyester sheet so that portions of the metal sheets may be etched away to form circuit conductors or other functional elements of the product to be made. The metal sheets also function as an etching resist covering for the "Mylar" base during the perforation of the latter by etching treatment. FIG. 6 shows light sensitive etching resist coatings 17 on the upper and lower metal surfaces. These coatings may be of the conventional type adapted to receive photo-printed images of the apertures to be formed by etching. FIG. 7 indicates the condition of the workpiece after the photo-printing and developing operations whereby exposed surface areas 18 of the metal sheets 16 are defined by etching resist enamel 19.

Figure 8:
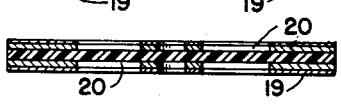
Figure 9:

As the next step in the procedure, a suitable metal etching agent is applied to the work and the etching is continued through the exposed areas 18 until openings 20 extending to the "Mylar" base sheet are formed in the metal, as indicated in FIG. 8. This etching away of the exposed areas of metal is followed by the application of my improved etching composition to the exposed areas of the polyester base to form apertures 21 therethrough in registry with the openings 20 in the metal laminations as shown in FIG. 9. The etching resist enamel 19 may be removed by the application of a suitable solvent thereto.

My improved etching composition may be used safely in a well ventilated workroom, since the gases emitted at the temperatures required for its use are not harmfully toxic to personnel in the concentration normally present in such rooms.

I claim:

1. A method of etching through polyethylene terephthalate resin film which comprises applying to selected areas thereof the reaction product of somewhat less than 50% by weight phenol and somewhat greater than 50% by weight fuming sulfuric acid with a relatively small portion of water in a sulfuric acid medium maintained at a temperature of approximately 220° F. to 230° F. until the film in said selected areas disintegrates.

2. A method of etching through polyethylene terephthalate resin film which consists of applying to selected areas thereof the reaction product of phenol approximately 38% by weight, fuming sulfuric acid approximately 57.5% by weight and a relatively small proportion of water.

3. A method of etching through polyethylene terephthalate resin film which consists of applying to selected areas thereof the reaction product of an aqueous solution of phenol and fuming sulfuric acid at a temperature on the order of 220° F. to 230° F. the approximate proportions by weight being, phenol 38%, water 4.5% and sulfuric acid 57.5%.

References Cited by the Examiner

UNITED STATES PATENTS

| | | | |
|---|---|---|---|
| 2,469,689 | 5/49 | Gresham | 156—11 XR |
| 2,968,538 | 1/61 | Chapman | 156—2 |
| 3,075,866 | 1/63 | Baker et al. | 156—13 |

OTHER REFERENCES

Polyesters and Their Applications (TP 986P6B5C.7), Bjorksten Research Lab., Reinhold Pub. Co., New York, c. 1956, pp. 218 and 222.

ALEXANDER WYMAN, *Primary Examiner.*
EARL M. BERGERT, JACOB STEINBERG,
*Examiners.*